(12) United States Patent
Fuchs

(10) Patent No.: US 8,132,189 B1
(45) Date of Patent: Mar. 6, 2012

(54) WS-MANAGEMENT RESOURCE MBEAN WRAPPER FOR JAXB BEANS

(75) Inventor: Daniel Fuchs, Le Touvet (FR)

(73) Assignee: Oracle America, Inc., Redwood City, CA (US)

( * ) Notice: Subject to any disclaimer, the term of this patent is extended or adjusted under 35 U.S.C. 154(b) by 1079 days.

(21) Appl. No.: 11/505,536

(22) Filed: Aug. 16, 2006

(51) Int. Cl.
*G06F 9/44* (2006.01)

(52) U.S. Cl. ........ 719/328; 717/100; 717/104; 717/106; 717/120

(58) Field of Classification Search .................. None
See application file for complete search history.

(56) References Cited

U.S. PATENT DOCUMENTS

2003/0177477 A1* 9/2003 Fuchs ............................ 717/136
2003/0191803 A1* 10/2003 Chinnici et al. .............. 709/203

OTHER PUBLICATIONS

"Web-Based Enterprise Management (WBEM)" date downloaded Jun. 25, 2010 from http://www.dmtf.org/standards/wbem/.*

"Web Services for Management (WS-Management Jun. 2005)" by Arora et al. (published Jun. 2005) (attached as "ws-management. pdf") (URL: http://specs.xmlsoap.org/ws/2005/06/management/ws-management.pdf).*

"The Java API for XML Web Services (JAX-WS) 2.0" by Hadley et al. (published Jun. 21, 2005) online at: https://cds.sun.com/is-bin/INTERSHOP.enfinity/WFS/CDS-CDS_JCP-Site/en_US/-/USD/ViewFilteredProducts-SimpleBundleDownload.*

* cited by examiner

*Primary Examiner* — S. Sough
*Assistant Examiner* — Shih-Wei Kraft
(74) *Attorney, Agent, or Firm* — Martine Penilla Group, LLP

(57) ABSTRACT

An approach is provided in embodiments of the present invention for utilizing Java™ Management Extensions (JMX) as a back end to "instrument" (i.e. monitor and control) computer system resources, including servers, devices, and applications etc., within standard resource management model(s) that are external to Java™. For example, JMX can be used as a back end to instrument WS-Management resources—in particular, JMX MBeans can be used to implement Common Information Model (CIM) WS-Management resources.

11 Claims, 6 Drawing Sheets

WS-MANAGEMENT RESOURCE MBEAN WRAPPER FOR JAXB BEANS

CROSS REFERENCE TO RELATED APPLICATIONS

The present application is related to U.S. application Ser. No. 11/506,086, entitled "System For Instrumenting Resources Utilizing WS-Management Resource MBean Wrappers For JAXB Beans," filed on the same date as the present application, the related application being incorporated herein by reference.

BACKGROUND

1. Field of the Invention

The invention relates generally to the management of system resources, and more particularly, to a system and method for utilizing Java™ Management Extensions (JMX) as a back end to "instrument" (i.e. monitor and control) system resources within standard resource management models that are external to Java™.

2. Description of the Related Art

Today's computer systems often require complex infrastructures that include numerous resources such as software applications, hardware devices, databases, application servers, etc. which are of themselves complex and typically distributed across multiple computing environments, including Internet environments. In such complex systems it is advantageous to have monitoring capabilities to manage system resources for purposes of identifying, isolating and resolving problems at the service, transaction, application and resource levels of the system.

To promote interoperability between remote management applications which provide system monitoring etc. capabilities and the resources they manage, the Web Services Management (WS-Management) specification provides a common method for systems to access and exchange management information across an entire system infrastructure. Specifically, the WS-Management specification identifies a core set of Web service specifications and usage requirements to expose a common set of operations that are central to all systems management. These core services provide the ability to: (1) "Discover" the presence of management resources and navigate between them; (2) "Get", "Put", "Create", and "Delete" individual management resources, such as settings and dynamic values; (3) "Enumerate" the contents of containers and collections, such as large tables and logs; (4) "Subscribe" to events emitted by managed resources; and (5) "Execute" specific management methods with strongly typed input and output parameters.

Additionally, the Common Information Model (CIM) is an information model that can simplify the WS-Management domain and other management domains by unifying and extending existing instrumentation and management standards using an object-oriented approach. For example, using abstraction and classification, CIM reduces the complexity of system management by defining resources ("objects") of the management domain and grouping these "objects" into types ("classes") by identifying the common characteristics and features ("properties"), relationships ("associations"), or behavior ("methods") of the "objects." To implement the WS-Management-CIM model, WS-Management defines a WS-Management-CIM resource mapping and, in particular, WS-Management defines XML (Extensible Markup Language) schema for CIM "classes."

On the other hand, Java Management Extensions (JMX) is a technology feature included in the Java™ platform that provides a simple, standard way of managing system resources by allowing a management application the ability to monitor and modify the properties and invoke the operations associated with a managed resource. Specifically, JMX provides a standard interface for monitoring and controlling applications and for monitoring and controlling the infrastructure components (resources) associated with the applications (e.g. hardware devices, databases, application servers, etc.). In particular, insight into the health and performance of these applications and infrastructure components can be gained through the use a Java™ object called a Managed Bean (MBean) that represents a manageable resource, such as an application, a component, or a device. MBeans integrate with applications, components, or other resources to expose the properties (values) and operations associated with these applications, components, resources, etc. in a manner that allows, for example, a management application (e.g. a client) the ability to monitor and modify the properties and invoke the operations. Because JMX is dynamic, it can be used to monitor and manage resources as they are created, installed and implemented. Using JMX technology, a particular resource is "instrumented" by one or more MBean. The MBeans are registered in a core managed object server, known as an MBean server that acts as a management agent and can run on most devices enabled for the Java™ programming language. The JMX specification defines JMX agents that are used to manage resources "instrumented" in compliance with the specification. A JMX agent consists of an MBean server, in which MBeans are registered, and a set of services for handling MBeans. In this way, JMX agents directly control resources and make them available to remote management applications.

In view of the forgoing, there is a need for an approach that utilizes JMX MBeans to implement WS-Management-CIM resources in a manner that allows an exposed MBean to follow a given XML schema defined by a standard model that is external to Java™, as would be the case with the WS-Management-CIM model.

SUMMARY

In one embodiment, the present invention provides a method for creating an MBean that is capable of instrumenting a system resource from a non-Java model. The method comprises generating one or more Java API for XML Binding (JAXB)-serializable Java beans. The method also comprises creating an instance of the MBean, wherein the MBean is capable of wrapping each one of the one or more JAXB-serializable beans for instrumenting the system resource deriving from the non-Java model.

In another embodiment, the present invention provides a computer-readable media for directing a computer to create an MBean that is capable of instrumenting a system resource deriving from a non-Java model. The computer-readable media comprises instructions for generating one or more Java API for XML Binding (JAXB)-serializable Java beans. The computer-readable media further comprises instructions for creating an instance of the MBean, wherein the MBean is capable of wrapping each one of the one or more JAXB-serializable beans for instrumenting the system resource deriving from the non-Java model.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Figure 1:
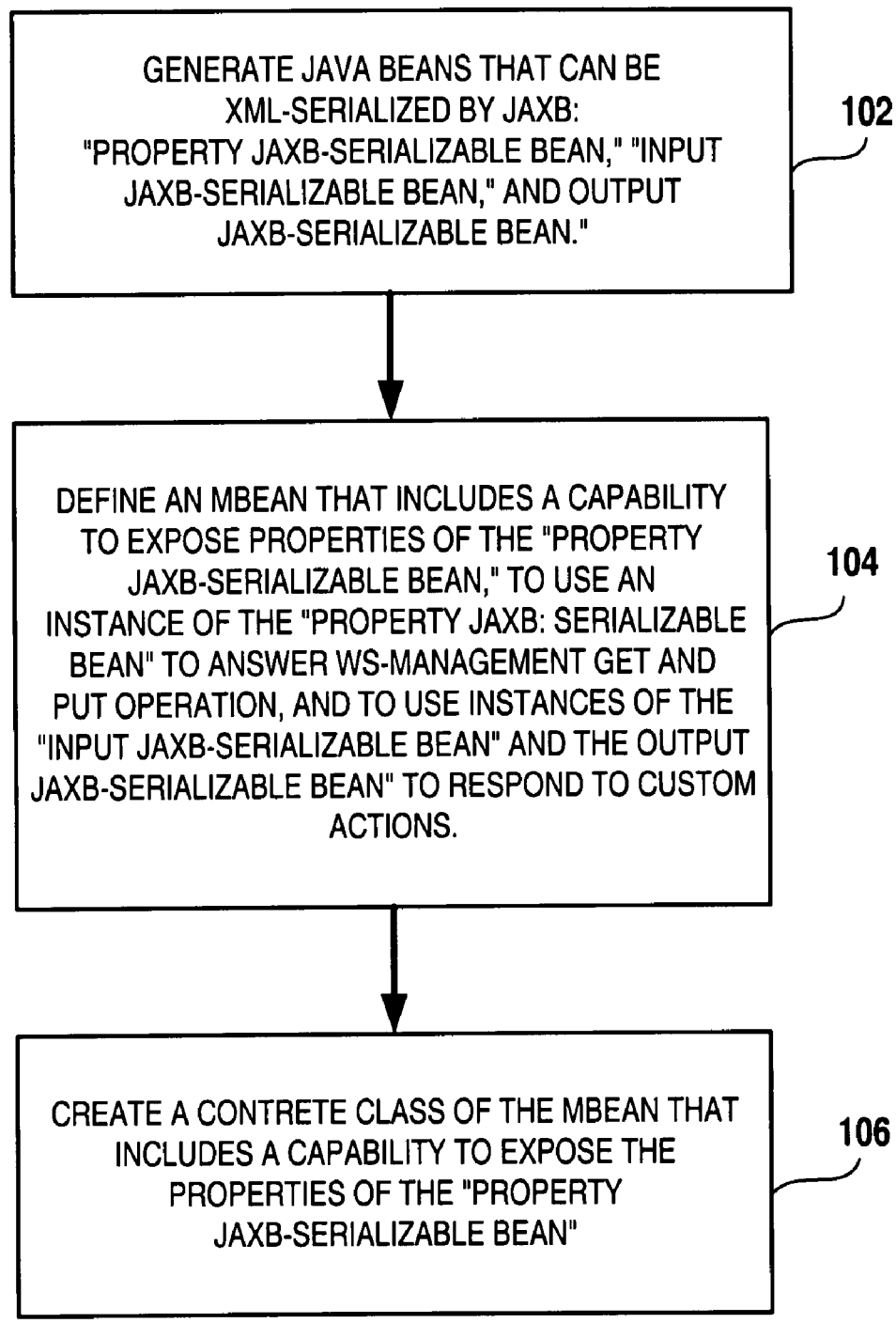
FIG. 1 is a flowchart illustrating a method for creating an MBean that is capable of wrapping a JAXB-serializable bean for instrumenting resources managed within a non-Java™ model, in accordance with an embodiment of the present invention.

An approach is provided in embodiments of the present invention for utilizing Java™ Management Extensions (JMX™) as a back end to "instrument" (i.e. monitor and control) computer system resources, including servers, devices, and applications etc., within standard resource management model(s) that are external to Java™. For example, JMX can be used as a back end to instrument WS-Management resources—in particular, JMX MBeans can be used to implement Common Information Model (CIM) WS-Management resources. As provided in detail below, advantages of embodiments of the present invention include, but are not limited to, a capability to derive MBean Names from WS-Management names (i.e., a natural mapping can be derived from WS-Management CIM v2.9 Resource Names, for example), and a capability to map JMX Notifications to WS (Web Services) Events. A further advantage of embodiments of the present invention is that instrumenting with JMX™ can be a preferable choice for server-side implementations.

As previously mentioned, WS-Management defines a CIM to WS-Management resource mapping and, in particular, WS-Management defines Extensible Markup Language (XML) schemas for CIM classes. Embodiments of the present invention, propose an approach for using Java™ API for XML Binding (JAXB) to generate the XML binding between such "standard" schema and JAVA™, and subsequently using JMX to "instrument" a JAXB-serializable bean in an MBean. The approach of embodiments of the present invention is particularly advantageous because it provides the capability to completely control how an MBean will be "serialized" (software objects like Java Beans generally only survive as long as there's an active reference to them, and as long as the program in which they run is executing—however, such objects can be "serialized," or converted into a stream of bytes, for example, which can be used to reconstruct the object at some other place or time) in XML when answering WS-Management "Get" and "Put" methods etc. Specifically, the approach of embodiments of the present invention guarantees that the exposed MBean will follow a given XML schema defined by a standard model external to JAVA™, as would be the case with the WS-Management-CIM model.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. The present invention includes several aspects and is presented below and discussed in connection with the Figures and embodiments.

In FIG. 1, an embodiment of the present invention provides a method 100 for creating an MBean which is a DynamicMBean that is capable of wrapping a JAXB-serializable bean for instrumenting WS-Management resources etc. conforming to "standard" XML schemas. WS-Management, and in particular WS-Transfer, defines standard operations "Get" and "Put" to respectively get and set properties on a WS-Management resource. WS-Management also defines a means to instrument CIM classes as WS-Management resources. In short, WS-Management defines how to derive an XML schema (.xsd) for performing WS-Transfer "Get" and "Put" operations on a WS-Management resource representing an instance of a CIM class, as well as a Web Services Description Language (WSDL) for representing CIM operations. The present invention provides an approach for utilizing JAXB beans to instrument WS-Management resources as MBeans according to embodiments of the present invention. JAXB is a technology that makes it possible to generate Java Beans from XML schemas, binding instances of these generated Java Beans to instances of XML documents (or XML fragments) following the XML schemas. In the remainder of this document, the terms "JAXB-serializable" and "XML-Serializable" will be used interchangeably to describe Java Beans that can be serialized in XML utilizing JAXB technology.

In step 102, JAXB-serializable beans can be generated by leveraging existing XML Java binding technologies that include JAXB, etc. Specifically, in one embodiment of the present invention, a JAXB (Java XML Binding) compiler can be used to generate Java Beans that can be XML-serialized by JAXB (JAXB-serializable beans), from an XML schema defining a WS-Management resource where the WS-Management resource defines the input and output for WS-Transfer "Get" and "Put" etc. operations, as well as from an XML schema defining input and output for CIM operations, or from both. Specifically, in one embodiment of the present invention, for each CIM class or for each class defined by a Schema+WSDL (not necessarily CIM) there can be: at least one JAXB-serializable Java Bean containing the properties defined in the CIM class (hereinafter "Property JAXB-Serializable Bean") or at least one JAXB-serializable Java Bean containing the properties defined in the Schema of the class defined by the Schema+WSDL (hereinafter "Property JAXB-Serializable Bean"). Similarly, for each action defined in the CM class or for each action defined in the WSDL of the class defined by Schema+WSDL there can be: at least one JAXB-serializable Java Bean for input parameters (hereinafter "Input JAXB-Serializable Bean")—if the action has one or more input parameters, and at most one JAXB-serializable Java Bean for output parameters (hereinafter "Output JAXB-Serializable Bean")—if the action has one or more output parameters (or result codes) which is generally the case in CIM.

In step 104, the MBean can be defined to include a capability to expose the properties of the Property JAXB-Serializable Bean, and to use an instance of the Property JAXB-Serializable Bean to answer standard management operations including WS-Transfer requests (e.g. "Get" and "Put" etc.), as described in more detail in FIG. 2. Additionally, the MBean can be further defined to use instances of the Input JAXB-Serializable Bean and the Output JAXB-Serializable Bean to respond to custom WS-Management actions that can include those operations defined in the CIM model for a particular class, as described in more detail in FIG. 3. For example, using an instance of the Input JAXB-Serializable Bean to transport input parameters associated with a resource-specific action defined for a system resource and using an instance of the Output JAXB-Serializable Bean to return the output of the resource-specific actions.

In step 106, an instance of the MBean defined in step 102 is created. More specifically, a concrete instance (or class) of the MBean can be created that includes a capability to expose the properties of the Property JAXB-Serializable Bean as MBean attributes by introspecting the Property JAXB-Serializable. This concrete class of the MBean is hereinafter illustratively referred to as a "WSManJAXBMBean." The WSManJAXB-MBean of embodiments of the present invention is a DynamicMBean, as previously mentioned, that is able to wrap a JAXB-serializable bean which represents a class generated by JAXB from an XML top-level element representing a WS-Management resource or a WS-Management resource that can be derived from a CIM class. This approach answers the problem of instrumenting WS-Management resources or other resources that derive from a non-Java™ model. For illustrative purposes only, exemplary code segments for the creation of the WSManJAXBMBean are provided in Table A below:

TABLE A

```
// Create a serializable JAXB element conforming to the
// CIM_ComputerSystem.xsd
//
final CIMComputerSystemType bean = new CIMComputerSystemType( );
final ObjectFactory cimFactory = new ObjectFactory ( );
final JAXBElement<CIMComputerSystemType> elt =
            cimFactory.createCIMComputerSystem(bean);
// Create an MBean that instruments a resource generated from the
// CIM_ComputerSystem.xsd
//
final WSManJAXBMBean mbean = new WSManJAXBMBean (elt,
            CIMComputerSystemType.class);
// Optionally create a ResourceDelegate that can take actions when
// the resource is invoked.
//
final ResourceDelegate delegate = . . . ;
mbean.setResourceDelegate (delegate);
// Create a name that is compatible with the default CIMResourceNaming
//
final ObjectName n = new
            ObjectName("cimv2.9:type=CIM_ComputerSystem," +
            "Name=elbruz,CreationClassName=ComputerSystem");
// Register the Mbean
//
server.registerMBean(mbean, n);
```

It is worth noting that in contrast to a conventional javax.managment.StandardMBean class, for example, the WSMan-JAXBMBean of embodiments of the present invention does not wrap an instance of a class that implements an MBean interface, rather the WSManJAXBMBean wraps a Java Bean that can be XML-serialized by JAXB. In further contrast, the WSManJAXBMBean includes a capability to return the wrapped Java Bean to a WS-Management adaptor for "Get" and "Put" operations, and the WSManJAXBMBean includes a capability to accept an instance of the wrapped Java Bean from a WS-Management adaptor for "Put" operations. Also the WSManJAXBMBean of embodiments of the present invention maintains a capability to expose the properties of the wrapped Java Bean as MBean attributes, and the WSMan-JAXBMBean can be sub-classed to implement custom operations. In another embodiment of the present invention, the WSManJAXBMBean includes that capability to introspect a JAX-WS (Web Services) generated service interface to handle custom actions.

Figure 2A:
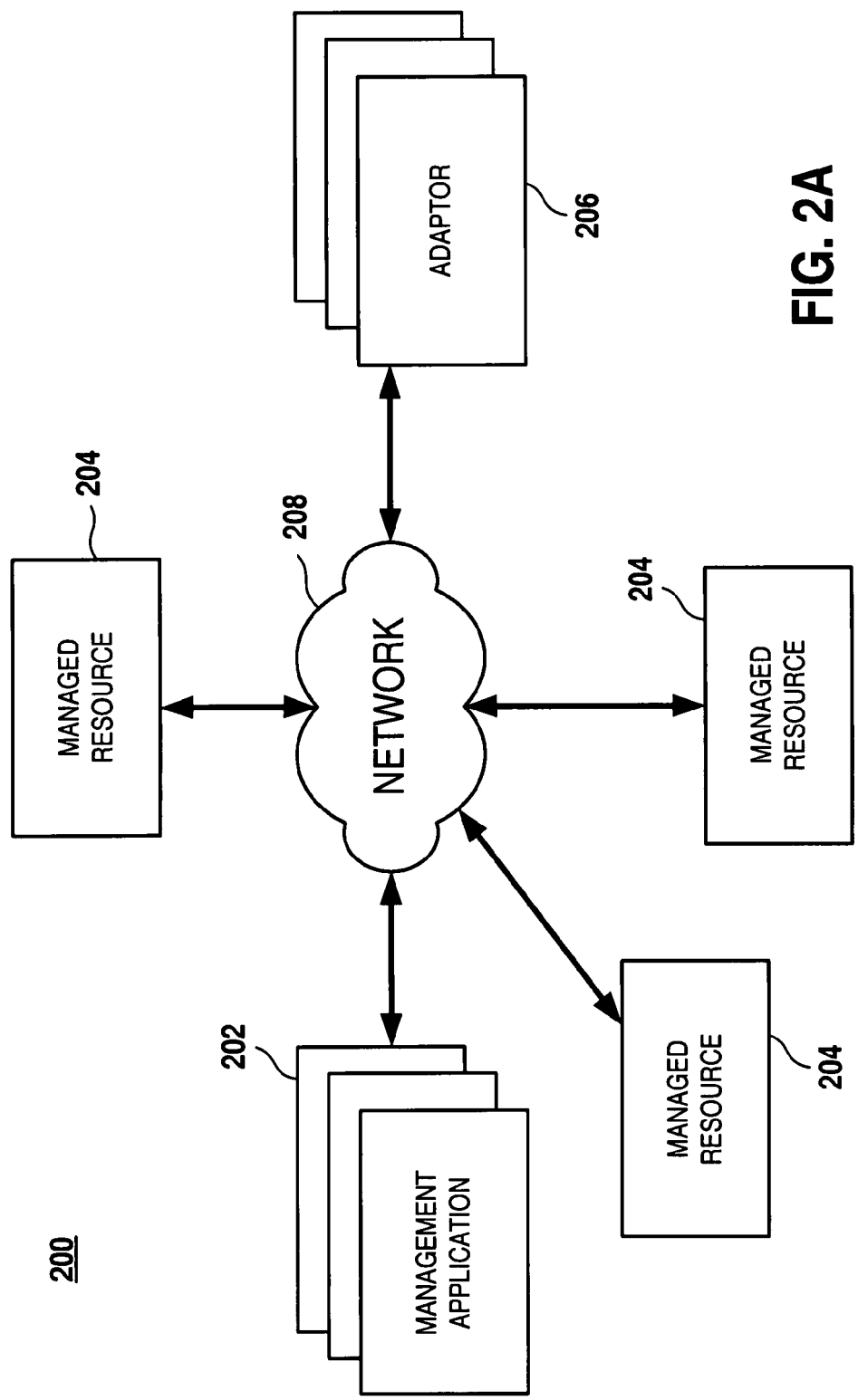
FIG. 2A is a system for implementing the MBean of FIG. 1 to instrument a managed system resource, in accordance with an embodiment of the present invention.

In FIG. 2A, in one embodiment of the present invention, a System 200 is provided for instrumenting resources within a system infrastructure by implementing an MBean of the class WSManJAXBMBean discussed above in FIG. 1. The System 200 of the present embodiment includes one or more Remote Management Applications 202 that can utilize requests associated with standard management operations or resource specific actions to manage (i.e. monitor and control) large numbers of Resources 204 that can be distributed across a system infrastructure. The System 200 of an embodiment of the present invention also includes Adaptor 206 that is responsible for translating the requests (received from a Remote Management Application 202 via the Network 208) targeted for a particular Resource 204 into management commands that are specific to the targeted Resource 204. In particular, the Adaptor 206 of an embodiment of the present invention, as discussed below in FIG. 2B, can implement MBeans of FIG. 1 to answer such requests.

Figure 2B:
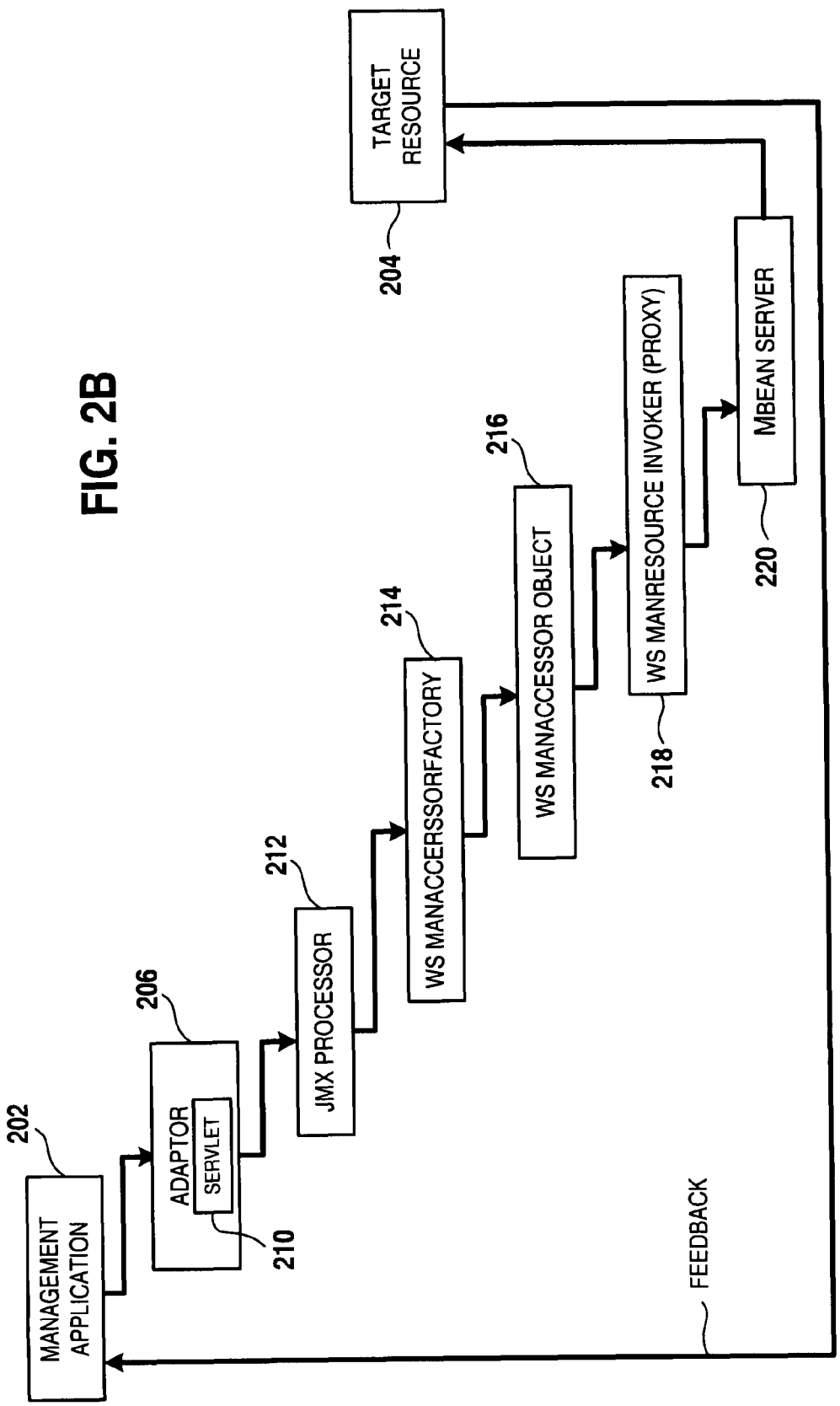
FIG. 2B is a system for implementing the Adaptor of FIG. 1 to instrument the managed system resource, in accordance with an embodiment of the present invention.

In FIG. 2B, to explain an implementation of the MBean of FIG. 1 within the System 200 according to an embodiment of the present invention, it is useful to begin by discussing the manner in which the MBean can be exposed by JMX WS-Management Adaptor 206. In one embodiment of the present invention, JMX WS-Management Adaptor 206 is composed of Servlet-like Object 210 that is capable of receiving WS-Management requests (e.g. "Get", "Put", "Invoke", etc.) from Remote Management Application 202 via the Network 208. Specifically, when the request reaches the Adaptor 206, Servlet-like Object 210 creates a request context for the incoming request and forwards the incoming request to JMXProcessor 212. In response to the incoming request, JMXProcessor 212 invokes WSManAccessorFactory 214. WSManAccessorFactory 214 is a process that is responsible for identifying which MBean is instrumenting the WS-Management Resource 204 that is the target of the incoming request. In turn, WSManAccessorFactory 214 creates a WSManResourceAcessor Object 216 that is responsible for invoking the standard management operation or resource-specific action associated with the incoming request.

WSManResourceAcessor Object 216 then creates a proxy for accessing the MBean that is capable of instrumenting the relevant target WS-Management Resource 204. Specifically, WSManResourceAcessor 216 creates a WSManResourceInvoker Proxy 218 to invoke the MBean by invoking the requested operation or action (e.g. Get( ) Put( ) Invoke ( ) etc.) on the target MBean. In response to this function invocation, MBeanServer 220, which is a repository for the MBean, calls the target MBean which implements WSManResourceInvoker 218 where one such implementation of WSManResourceInvoker 218 can be the WSManJAXBMBean. In turn, the MBean which is instrumenting the target Resource 204 can invoke the target Resource 204 and return the result as a JAXB-serializable bean (see FIG. 1 at 102) which will be returned to the Management Application 202 as XML-serialized data embedded in the WS-Management response, via the Network 208. It is worth noting here that the Managed Resource 204 can be either distributed across the Network 208, with access to the Resource 204 provided through a specific management protocol such as JMX or SNMP by the WSManJAXBMBean instrumentation code, or the Managed Resource 204 can simply reside on a machine or within an application in which the Adaptor 206 is initiated.

It is important to note here that there can be many implementations for the WSManAccessorFactory-WSManResourceAcessor interface discussed above. For example, in one embodiment of the present invention, the WSManAccessorFactory-WSManResourceAcessor interface can embed application specific knowledge for purposes of mapping the WS-Management model to an application specific model. Specifically, one case of WSManAccessorFactory-WSManResourceAcessor interface is a WSManAccessorFactory class 214 that is able to create WSManResourceAccessor Object 216 which, in turn, has the capability to invoke MBeans that directly implement the WSManResourceInvoker Proxy 218 interface, as described above. In other words, WSManResourceInvoker 218 is not a specific object implemented on the WSManResourceAccessor 216 side using an application model (mapping metadata), rather WSManResourceInvoker 218 is a proxy that directly invokes an MBean implementing the same WSManResourceInvoker 218 interface. However, the WSManJAXBMBean is but one embodiment of an MBean implementing the WSManResourceInvoker 218 interface. In fact, there can be several embodiments of these MBeans—for example, a "WSManDynamicMBean" which can be a subclass of StandardMBean that can additionally implement the WSManResourceInvoker 218 interface and create a dynamic XML serialization of the MBean data by introspecting the MBean's MBeanInfo.

Referring still to FIG. 2, in the case of the WSManJAXBMBean of embodiments of the present invention, the WSManResourceInvoker 218 can be a simple pass-through proxy created using a standard JMX MBeanServerinvocationHandler illustrated in Table B below:

TABLE B javax.managment.MBeanServerInvocationHandler.
newProxyInstance (mbeanServer, objectName,
WSManResourceInvoker.class, false);

For illustrative purposes only, exemplary code segments for the WSManResourceInvoker 218 interface are provided in Table C below:

TABLE C

```
public interface WSManResourceInvoker {
//
// Apply a WS-Transfer Get operation on the underlying resource.
// Returns the result in the form of a JAXB XML-serializable element,
// or DOM Node.
// @throws java.lang.Exception, if the operation cannot be performed.
// @return A JAXB XML-serializable element, or a DOM Node.
// The result will be directly passed to JAXB and serialized into the
// response body.
//
```

TABLE C-continued

```
public Object Get( )            throws Exception;
//
// Apply a WS-Transfer Put operation on the underlying resource.
// Returns the result in the form of a JAXB XML-serializable element,
// or a DOM Node.
// @param attributes The WS-Management Put parameters.
//     This is the result of JAXB unmarshalling on the request body
//     content. If the request body content couldn't be unmarshalled,
//     this will be a DOM Node.
// @throws java.lang.Exception, if the operation cannot be performed.
// @return A JAXB XML-serializable element, or a DOM Node.
// The result will be directly passed to JAXB and serialized into the
// response body.
//
public Object Put (Object attributes)         throws Exception;
//
// Invoke a WS-Management custom action on the underlying
// WS-Management resource.
// @param action The action URI, as extracted from
{@code wsa:Action}
// @param input The action input parameters. This is the result of JAXB
//     unmarshalling on the request body content. If the request body
//     content couldn't be unmarshalled, this will be a DOM Node.
// @throws java.long.Exception, if the operation cannot be performed.
// @return A JAXB XML-serializable element, or a DOM Node.
// The result will be directly passed to JAXB and serialized into the
// response body.
public Object Invoke(String action, Object input)     throws Exception;
}
```

However, it is important to note that the WSManResourceInvoker 218 interface of embodiments of the present invention can also support other WS-Management etc. features including, but not limited to, Create( ), Delete( ), Notifications, WS-Transfer fragment using XPath, etc.

Additionally, the WSManResourceInvoker 218 interface can make it possible to create a WSManResourceAccessor 216 that can directly contain application model specific knowledge about how to map application-specific MBeans to the expected XML schema. In this case, the WSManResourceAccessor 216 can provide a concrete implementation of the WSManResourceInvoker 218 interface containing such knowledge. This concrete object provided by the application-specific implementation of the WSManResourceAccessor 216 would know how to transform the WSManResourceInvoker 218 calls (Get( ), Put( ), Invoke( ), etc.) into standard JMX invocation to the application-specific MBeans (getAttribute[s]( ), setAttribute[s]( ), invoke( ) etc.). In other words, in such an embodiment of the WSManAccessorFactory-WSManResourcAccessor pattern, the WSManAccessorFactory-SManResourceAccessor can contain all the mediation logic instead of delegating such logic to the MBean.

Referring still to FIG. 2, in one embodiment of the present invention, if the operation requested by the Management Application 202 is a Put( ) operation, the JMXProcessor 212 uses the JAXB unmarshaller etc. returned by the WSManResourceAcessor 216 to unmarshall the Put( ) request's body content, which in turn produces an instance of the JAXB bean wrapped by the WSManJAXBMBean. Those of ordinary skill can recognize that an "unmarshaller" is an artifact of the JAXB technology that produces an instance of a Java Bean (e.g., an instance of one of the classes generated in FIG. 1 at step 102) from an XML source. The JMXProcessor 212 then calls the Put(attributes) operation on the WSManResourceInvoker 218 returned by the WSManResourceAccessor 216, passing the unmarshalled JAXB Bean as a parameter. In the case of the WSManJAXBMBean, in one embodiment of the present invention, these operations return an instance of the wrapped JAXB bean. In another embodiment of the present invention, the Get( ) or Put(attributes) operations can directly return a DOM (Document Object Model) node. The JMX-Processor 212 then uses the JAXB marshaller etc. returned by the WSManResourceAccessor 216 to marshall the returned object into the response body. Again, those of ordinary skill can recognize that a "marshaller" is an artifact of the JAXB technology that performs the opposite operation as that performed by an "unmarshaller" (e.g., from an instance of one of the Java Beans produced in FIG. 1 at step 102, the marshaller can create an XML fragment).

Referring still to FIG. 2, in another embodiment of the present invention, when a JMX operation getAttribute(s) or setAttribute(s) call reaches WSManJAXBMBean, WSManJAXBMBean examines the name of the attribute(s) to be get or set, and gets or sets the corresponding attributes on the wrapped JAXB bean.

In view of the discussion above, it should be apparent that the WSManResourceInvoker 218 can be the interface through which an MBean of the WSManJAXBMBean class can be invoked by the Adaptor 206. As a result, WSManJAXBMBean is able to wrap a JAXB serializable bean, which WSManJAXBMBean uses to exchange data with the WS-Management stack. In other words, the concrete result of the Get( ) and Put( ) etc. functions defined in the WSManResourceInvoker 218 interface (e.g., see Table C above) are instances of the wrapped JAXB serializable bean. The concrete parameter of the Put( ) function defined in the WSManResourceInvoker 218 interface is also an instance of the wrapped JAXB serializable bean. By exchanging an instance of the wrapped JAXB serializable bean with the WS-Management stack, WSManJAXBMBean makes it possible to leverage JAXB serialization and instrument a WS-Management resource etc. that conforms to a given XML schema, possibly defined by an external non-Java™ model such as the WS-Management-CIM model discussed herein. Moreover, WSManJAXBMBean is capable of leveraging the Java™ Bean Introspector to determine the Java™ Bean property of the bean class that it wraps and, for each such property, WSManJAXBMBean can expose corresponding MBean attributes to JMX clients. Additionally, WSManJAXBMBean is capable of "hiding" the functions defined in the WSManResourceInvoker 218 interface from WSManResourceInvoker 218 to JMX clients—in other words, the WSManJAXBMBean can elect not to publish these functions, simply by omitting a declaration of the functions in the WSManJAXBMBean's MBeanInfo. A JMX client can still invoke theses functions through the MBeanServer 220 interface, however, the functions will not be declared in the MBeanInfo returned by WSManJAXBMBean. Regular JMX clients thus only see the attributes/methods declared in the WS Management Resource's 204 model. Indeed, the methods (i.e. functions) that are declared in the WSManResourceInvoker 218 are only of interest to the Adaptor's 206 stack—not declaring the methods in the MBeanInfo makes it possible to present a clean view of the WS Management Resource's 204 model to other JMX clients.

In another embodiment of the present invention, a ResourceDelegate interface is provided to facilitate handling custom action requests associated with a Resource 204. Specifically, a capability is provided to register a ResourceDelegate with a WSManJAXBMBean such that the ResourceDelegate can be called each time a target resource is accessed, irrespective of whether the target resource is accessed from the WS-Management stack through the WSManResourceInvoker 218 interface (discussed above in FIG. 2 and Table B) or from the JMX stack through standard JMX calls like getAttribute(s), setAttribute(s), etc.

In yet another embodiment of the present invention, the MBean of WSManJAXBMBean discussed in FIG. 1 can be defined to optionally create a ResourceDelegate that can take a particular action when a Resource 204 is invoked. This ResourceDelegate can be a callback interface that defines pre-methods and post-methods that are invoked before and after the JAXB bean is accessed or modified. The ResourceDelegate interface can include methods that are invoked when a custom action is invoked, either from the JMX stack or from the WS-Management stack. The ResourceDelegate interface makes it possible to implement the "real" instrumentation behind the instrumented target WS-Management Resource 204. For example, changing the value of a property of a WSManJAXBMBean instrumenting a Resource 204, via a setAttribute(s) operation, can result in flushing a particular system configuration to a disk. Additionally, obtaining a property of a WSManJAXBMBean instrumenting a Resource 204, via a getAttribute(s) operation, can trigger an update or refresh of the JAXB bean wrapped by that MBean. For illustrative purposes only, exemplary code segments for the ResourceDelegate interface are provided in Table D below:

Table D

```
public interface ResourceDelegate {
    //
    // This method is called when a WS-Transfer PUT request is received,
    // or when a setAttribute(s) request is invoked through the
    DynamicMBean interface.
    // This method is called before the JAXB generated bean wrapped by
    // the {@link WSManJAXBMBean} is udpdated.
    // This method can be used to implement some checks on the requested
    // values, sync-up the wrapped resource, etc.
    // @param resource The JAXB generated bean wrapped by the MBean.
    // @param properties The list of properties that will be modified on the
    //      bean resource.
    // @param values The requested values to be set on the bean resource.
    // @throws java.lang.Exception if the operation should fail.
    //
    public void preSetProperties(Object resource, String[ ] properties,
            Object[ ] values)           throws Exception;
    //
    // This method is called when a WS-Transfer PUT request is received,
    // or when setAttribute(s) is invoked through the
    DynamicMBean interface.
    // This method is invoked after the JAXB generated bean wrapped by
    // the {@link WSManJAXBMBean} has been updated.
    // @param resource The updated bean resource
    // @param properties The properties for which an update was requested.
    // @param x {@code null} if the update succeeded. The exception that
    // was raised otherwise.
    //
    public void postSetProperties(Object resource, String[ ] properties,
            Throwable x);
    //
    // This method is called when a WS-Transfer GET request is received,
    // or when getAttribute(s) is invoked through the
    DynamicMBean interface.
    // This method is called before the JAXB generated bean wrapped by
    // the {@link WSManJAXBMBean}is examined. This method can
    // be used to e.g., refresh the content of the wrapped bean before
    it is returned.
    // @param resource The bean resource that will be returned.
    // @param properties The list of properties that were requested.
    // @throws java.lang.Exception if the operation should fail.
    //
    public void preGetProperties(Object resource, String[ ] properties,
            Throwable x);
    //
    // This method is called when a WS-Transfer GET request is received,
    // or when getAttribute(s) is invoked through the
    DynamicMBean interface.
    // This method is called after the requested values were extracted from
    // the JAXB bean wrapped by the {@link WSManJAXBMBean}.
    // @param resource The resource bean from which the requested values
```

Table D-continued

```
//       were extracted.
// @param properties The list of properties that were requested.
// @param x {@code null} if the operation was successful, the
// exception raised otherwise.
//
public void postGetProperties(Object resource, String[ ] properties,
        Throwable x);
//
// Called when a WS-Management custom action is invoked through
// the WS-Management stack.
// @param resource The resource bean wrapped by the
//      {@link WSManJAXBMBean}.
// @param input The action input parameters. This is the result of JAXB
//      unmarshalling on the request body content. If the request
//      body content couldn't be unmarshalled, this will be a
DOM Node.
// @throws java.lang.Exception If the operation fails.
// @return A JAXB XML-serializable element, or a DOM Node.
// The result will be directly passed to JAXB and serialized into
// the response body.
//
public Object invokeResource(Object resource, String actionURI,
        Object input) throws Exception;
//
// Called when an operation is invoked through the
// DynamicMBean.invoke( ) interface.
//@param resource The resource bean wrapped by the
//      {@link WSManJAXBMBean}.
// @param methodName The invoked methodName, as in
//      {@link javax.management.DynamicMBean#invoke}.
// @param signature The invoked method signature, as in
//      {@link javax.management.DynamicMBean#invoke}.
// @throws java.lang.Exception If the operation fails.
// @return The invocation result, as would be returned by
//      {@link javax.management.DynamicMBean#invoke}.
//
public Object invokeResource(Object resource, String
methodName, Object[ ] params, String[ ] signature)
        throws Exception;
}
```

Figure 3:
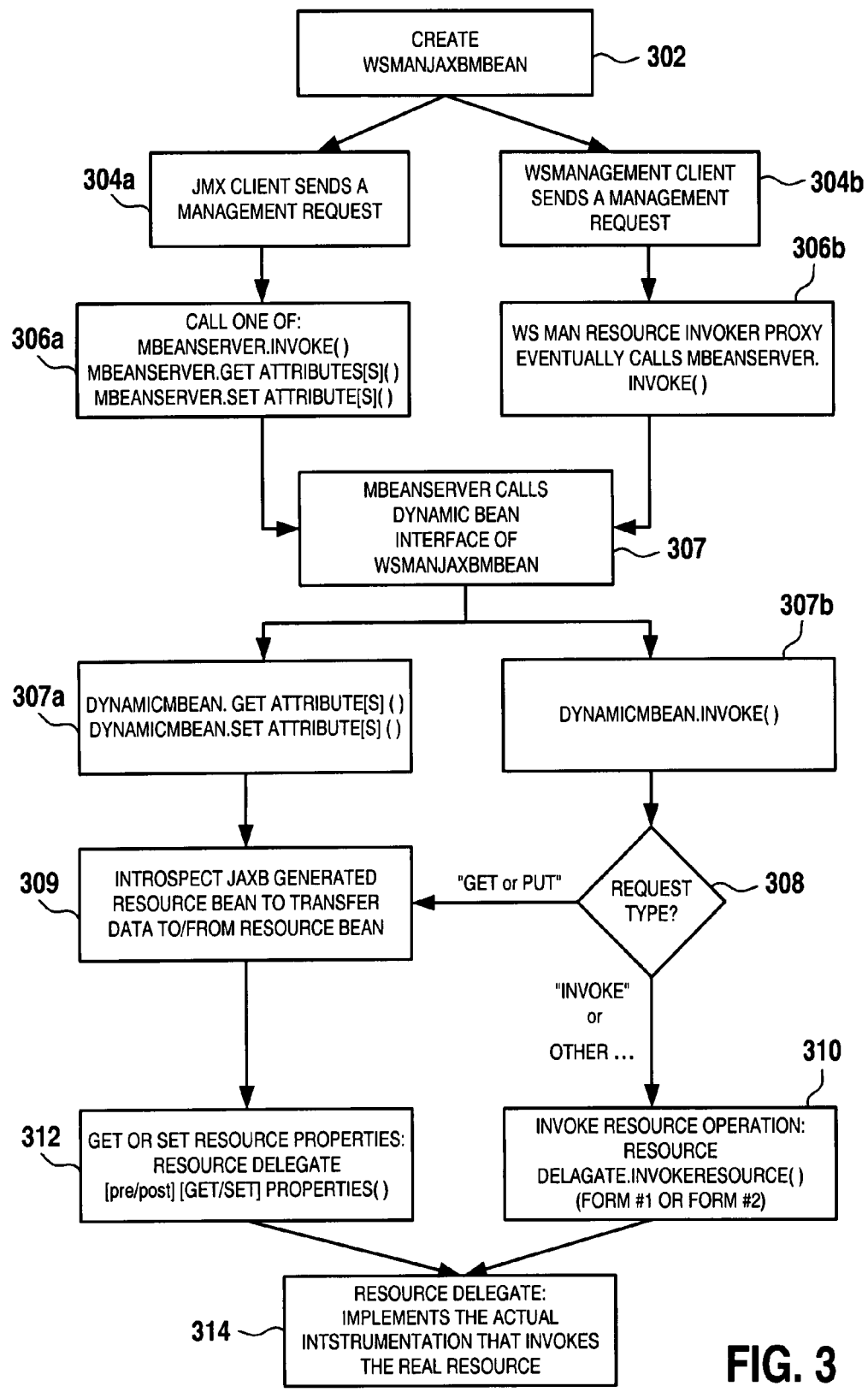
FIG. 3 is a method for answering custom action requests, in accordance within an embodiment of the present invention.

In FIG. 3, an embodiment of the present invention provides a method for answering custom action requests, utilizing the ResourceDelegate interface discussed above, that are targeted at a Resource 204 instrumented by a WSManJAXBMBean. Specifically, a custom action request can be handled utilizing at least one of two approaches depending upon whether the Resource 204 is accessed from a WS-Management stack through the WSManResourceInvoker interface of FIG. 2 or whether the Resource 204 is accessed from the JMX stack through standard JMX calls like getAttribute(s), setAttribute(s), etc.

In an initial step 302, a WSManJAXBMBean can be constructed with an array describing the operations that the ResourceDelegate supports. For example, in one embodiment of the present invention, WSManJAXBMBean can be constructed using a javax.managment.MBeanOperationInfo[ ] array.

In step 304a, in one embodiment of the present invention, if a Resource 204 is accessed from the JMX stack, a JMX Client generates a JMX management request. The method continues at step 306a.

In step 304b, in one embodiment of the present invention, if a Resource 204 is accessed from a WS-Management stack, the Management Application 202 (see FIG. 2) generates a WS-Management request. The method continues at step 306b.

In step 306a, in one embodiment of the present invention, the JMX client sends a management request by calling one of the following: MBeanServer.invoke( ), MBeanServer.getAttribute[s]( ), or MBeanServer.setAttribute[s]( ). The method continues at step 307.

In step 306b, in one embodiment of the present invention, the WS-Management client sends a management request by invoking WSManResourceInvoker proxy 218 (see FIG. 2) which calls MBeanServer.invoke( ). The method continues at step 307.

In step 307, in one embodiment of the present invention, the management request, eventually reaches the WSManJAXBMBean when the MBeanServer 220 (see FIG. 2) calls the DynamicMBean Interface of WSManJAXBMBean, irrespective of whether the request was initiated by a JMX client at step 304a or by a WS-Management client at step 304b. Those of ordinary skill can appreciate that irrespective of whether the management request of steps 304a and 304b is a WS-Management request or a standard JMX request, the management request will eventually reach the WSMan JAXB by one of three means: DynamicMBeanInvoke( ), DynamicMBean.setAttribute[s]( ), or DynamicMBean.getAttribute[s]( ).

If the management request is a WS-Management request, as at step 304b, the request can reach the WSManJAXBMBean through a call to DynamicMBean.invoke at step 307b irrespective of whether the request is initiated from a WS-Management request for a "Get," a "Put," or a WS-Management custom resource action. The method invoked through the DynamicMBean.invoke( ) call at step 307b can be one of those defined in the WSManResourceInvoker 218 interface (e.g., see Table above). In other words, the WSManResourceInvoker proxy 218 (see FIG. 2) calls MBeanServer.invoke( ) which, in turn, calls DynamicMBean.invoke( ) for any of the methods defined in the WSManResourceInvoker interface. For example, Table F below provides an exemplary illustration of the sequence of actions corresponding to a WS-Management request containing a custom resource action, thereby invoking DynamicMBean.invoke ("Invoke", . . . ). Similarly, DynamicMBean.invoke ("Get", . . . ) can be called for a WS-Management "Get" request to get resource properties, and DynamicMBean.invoke("Put", . . . ) can be called for a WS-Management "Put" request to set resource properties.

If the management request is a call issued by a JMX client, as at step 304a, the MBeanServer 220 will call one of DynamicMBean.invoke( ) at step 307b, or DynamicMBean.getAttribute[s]( ) at step 307a, or DynamicMBean.setAttribute[s]( ) at step 307a. DynamicMBean.invoke( ) invokes a resource operation on the WSManJAXBMBean, DynamicMBean.getAttribute[s]( ) gets a resource property/properties of the WSManJAXBMBean, and DynamicMBean.setAttribute[s]( ) sets a resource property/properties of the WSManJAXBMBean.

In step 308, if the management request of steps 304-306 is made by a call to WS-Management "Get" or WS-Management "Put", the method continues at step 309. Conversely, if the management request of steps 304-306 is made by a call to WS-Management "Invoke" or JMX "Invoke", the method continues at step 310.

In step 309, the WSManJAXBMBean can begin to arrange for invoking the ResourceDelegate for management requests made by calls to WS-Management "Get", WS-Management "Put", JMX "getAttribute", JMX "getAttributes", JMX "setAttribute", or JMX "setAttributes", by introspecting the JAXB generated resource bean to transfer data to/from the wrapped resource bean. The method continues at step 312.

In step 310, WS-Management custom resource actions etc. are eventually translated by the WSManJAXBMBean into a call to ResourceDelegate.invokeResource( ), as illustrated below in Table F (hereinafter "Form #1"). Similarly, JMX custom operations are eventually translated by the WSMan- JAXBMBean into a call to ResourceDelegate.invokeResource( ) (hereinafter "Form #2"). The method continues at step 314.

In step 312, WS-Management "Get", JMX "getAttribute", or JMX "getAttributes" calls are eventually translated by the WSManJAXBMBean into a pair of calls to ResourceDelegate.preGetProperties( ) and ResourceDelegate.postGetProperties( ). Likewise, WS-Management "Put", JMX "setAttribute", or JMX "setAttributes" are eventually translated by the WSManJAXBMBean into a pair of calls to ResourceDelegate.preSetProperties( ) and ResourceDelegate.postSetProperties( ). The method continues at step 314.

In step 314, the ResourceDelegate (e.g., see Table D) implements the actual instrumentation that invokes the "real" Resource 204 (see FIG. 2). Based on the discussion above, it should be apparent that the WSManJAXBMBean can arrange for invoking the ResourceDelegate, irrespective of whether the original request is a WS-Management request or a JMX request.

For illustrative purposes only, exemplary scenarios are provided below to further illustrate the FIG. 3 process involved in answering WS-Management and JMX client custom operation requests. Again, these scenarios are provided for illustrative purposes only and are not meant to limit the scope of embodiments of the present invention.

In one exemplary scenario, a manner in which the WSManJAXBMBean invokes a corresponding ResourceDelegate that is responsible for executing a requested WS-Management operation is discussed. For example, assuming there is a Resource 204 that is a printer and the printer has a custom operation: public int cancelJob (String jobId). Further assume that the printer is modeled by a WS-Management resource having a Uniform Resource Identifier (URI) of: http://www.sun.com/example/Printer and that the printer being managed and is identified by a WS-Management selector set containing a single selector: <wsman:SelectorName="PrinterName"> Printer001</wsman:Selector>. Also assume that the standard "cancelJob" printer operation is modeled in the WS-Management Printer model by the action: URI:http://www.sun.com/example/Printer/CancelJob. Finally, assume that an XML schema is defined for the Printer Resource that contains the elements of Table E below:

TABLE E

```
<xs:element name="printer"><xs:complexType><xs:sequence>
    <xs:element name="Status" type="xs.string"/>
    <xs:element name="CurrentJobId" type="xs:string"
        minOccurs="0" maxOccurs="1"/>
    <xs:element name="PendingJobIds" type="xs:string"
        minOccurs="0" maxOccurs="unbounded"/>
</xs:sequence></xs:complexType></xs:element>
<xs:element name="CancelJob. INPUT5"><xs:complexType>
    <xs:sequence><xs:element name="JobId" type=xs:string?>
</xs:sequence></xs:complexType></xs:element>
<xs:element name="CancelJob.OUTPUT"><xs:complexType>
    <xs:sequence><xs:element name="result" type="xs:int"/>
</xs:sequence></xs:complexType></xs:element>
```

As discussed above in FIG. 1 at step 102, it is assumed that one JAXB for each of the elements of Table E is generated. As such, the Management Application 202 (see FIG. 2) can send a WS-Management request to invoke the corresponding custom operation on the printer.

For purposes of illustration only, a WS-Management operation request with the resource URI: http://www.sun.com/example/Printer, the selector <wsman: SelectorName="PrinterName">PrinterOO1</wsman:Selector>, and the action URI http://www.sun.com/example/Printer/CancelJob, is received by a JMX WS-Management Adaptor 206 and further analyzed by a JMXProcessor 212 of the JMX WS-Management Adaptor 206. Specifically, the JMXProcessor 212 analyzes the addressing data (e.g. resource URI+selector set) contained in the SOAP (Simple Object Access Protocol) header of the WS-Management request, and then invokes WSManAccessorFactory 214. Based on the addressing data obtained by JMXProcessor 212, the invoked WSManAccessorFactory 214 can deduce the ObjectName of the MBean (a WSManJAXBMBean hereinafter referred to as "myJaxbPrinterMBean") that is responsible for the WS-Management resource (represented by a bean generated by JAXB from the XML schema describing the WS-Management printer resource) that is the target of the "cancelJob" operation request. For the purposes of illustration, assume that the name of the MBean identified by the WSManAccessorFactory is: myJaxbPrinterBean=new ObjectName("myModel:type= Printer,PrinterName=Printer001").

WSManAccessorFactory 214 then creates a WSManResourceAccessor 216 for the identified "myJaxbPrinterMBean" MBean. JMXProcessor 212 then calls the WSManRecourceAccessor.getInvoker( ) function to obtain a WSManResourceInvoker 218 which can be, for example, a proxy obtained from MBeanServerinvocationHandler.newProxyInstance( ). In particular, this will be the case when the identified MBean is an instance of a WSManJAXBMBean. JMXProcessor 212 next calls proxy.Invoke(actionURI, input) which, in turn, initiates the sequence of calls illustrated below in Table F:

TABLE F

```
// Call "Invoke" on the proxy - Invoke is an operation defined in
// WSManResourceInvoker
proxy.Invoke(actionURI, input);
// Proxy invokes "Invoke" on "myJaxbMBeanName" through the
MBeanServer
MBeanServer.invoke(myJaxbMBeanName, "Invoke",
        {"String", "Object"}, {actionURI,input});
// MBeanServer invokes "Invoke" through the DynamicMBean
// interface of our WSManJAXBJVIBean where the action invoked is a
// WS-Management custom action.
myJaxbMbean.invoke("Invoke", {"String","Object"}, {actionURI,input});
// "Invoke" is the channel by which WS-Management custom
// requests are invoked on objects implementing the
// WSManResourceInvoker interface, and the WSManJaxbMBean
is such an object.
myJaxbMBean.Invoke( actionURI, input);
// WSManJAXBMBean invokes its resource delegate, which is in
// charge of performing the actual operation.
output = ResourceDelegate.invokeResource(resource, actionURI, input);
return output;
```

Note:
action URI is the string "http://www.sun.com/example/Printer/CancelJob", that identifies the cancelJob custom action in our example WS-Management Printer model.
input is an instance of the JAXB bean generated from the <canceljob.INPUT> XML element defined in the XML schema modeling our WS-Management Printer Resource at step 102 of FIG. 1.
output is an instance of the JAXB bean generated from the <canceljob . OUTPUT> XML element defined in the XML schema modeling our WS-Management Printer Resource at step 102 of FIG. 1
resource is the instance of JAXB bean which is wrapped by the WSManJAXBMBean, and whose class was generated from the <Printer> XMLelement defined in the XML schema modeling our WS-Management Printer Resource at step 102 of FIG. 1.

Continuing with the first exemplary scenario, those skilled in the art can appreciate that the DynamicMBean.invoke( ) operation can be called for any of the WS-Management "Get", "Put", or custom operation, as well as when a JMX client invokes an operation on the resource modeled by the WSManJAXBMBean. When the DynamicMBean.invoke( ) operation is invoked (e.g., FIG. 3 at step 307b) on the WSManJAXBMBean and the DynamicMBean.invoke( ) operation is one of the operations defined in the WSManResourceMvoker interface, then the WSManJAXBMBean will proceed as discussed below.

If the operation invoked is a Get( ) operation, ResourceDelegate.preGetProperties( ) is invoked (e.g., FIG. 3 at step 312) to refresh any properties of its wrapped JAXB-bean (e.g., generated from the <Printer> element of the exemplary XML schema of Table E), then the operation returns the wrapped JAXB-bean and invokes ResourceDelegate.postGetProperties as illustrated in Table G below.

If the operation invoked is a Put( ) operation, the operation invokes ResourceDelegate.preSetProperties( ), transfers the values of the properties contained in the request to the operation's wrapped bean instance, returns the wrapped bean instance, and invokes ResourceDelegate.postSetProperties. In one embodiment of the present invention the argument to the Put( ) operation can be an instance of the bean that models the resource properties (e.g., an instance of the bean generated by JAXB from the XML <Printer> element that models the WS-Management Printer resource). Similarly, the result of the Put( ) operation is an instance of the same JAXB bean.

If the operation invoked is an Invoke( ) operation, as shown above in Table F above, the WSManJAXBMBean will invoke Form #1 (discussed above) of the ResourceDelegate.invokeResource( ) operation, and simply return the result. In this case, because the operation invoked is a custom operation that is specific to the instrumented resource (e.g., "cancelJob" for a printer resource) the ResourceDelegate is completely responsible for carrying out the action. Otherwise, the operation invoked is assumed to be a resource custom action and the WSManJAXBMBean directly invokes Form # 2 (discussed above) of the ResourceDelegate.invokeResource( ) operation and simply returns the result of the operation. Those skilled in the art can appreciate that the latter case, where Form #2 of the ResourceDelegate.invokeResource( ) operation is invoked, does not occur when the WSManResourceInvoker proxy is at the source of the DynamicMBean.invoke( ) operation invocation (see Table G above, "proxy.Invoke(actionURI,input);" call), since only methods defined in the WSManResourceInvoker interface can be invoked through such a proxy. In other words, the latter case occurs when the management request was a standard JMX call to invoke an MBean operation on the WSManJAXBMBean.

In another exemplary scenario, using the WS-Management "Get" request on the WS-Management printer resource discussed above, the "Get" request is received by a JMX JMX WS-Management Adaptor 206 and further analyzed by a JMXProcessor 212 of the JMX WS-Management Adaptor 206. Specifically, the JMXProcessor 212 analyzes the addressing data (e.g. resource URI+selector set) contained in the received management request and then invokes WSManAccessorFactory 214. Based on the addressing data obtained by JMXProcessor 212, the invoked WSManAccessorFactory 214 can deduce the ObjectName of the MBean that is responsible for the WS-Management resource in the same manner illustrated in Table F above. WSManAccessorFactory 214 then creates a WSManResourceAccessor 216 for the identified MBean. JMXProcessor 212 then calls the WSManResourceAccessor.getInvoker( ) function to obtain a WSManResourceInvoker 218 that can be a proxy obtained from MBeanServerInvocationHandler.newProxyInstance( ). JMXProcessor 212 next calls proxy.Get( ) which, in turn, initiates the sequence of calls illustrated in Table G below:

TABLE G

// Call "Get" on the proxy - Get( ) is an operation defined in
WSManResourceInvoker proxy.Get( );
// Proxy invokes "Get" on "myJaxbMBeanName" through the
MBeanServer TABLE G-continued MBeanServer.invoke(myJaxbMBeanName, "Get");
// MBeanServer invokes "Get" through the DynamicMBean interface
// of our WSManJAXBMBean (action invoked is a WS-Management
// "Get" action)
myJaxbMbean.invoke("Get");
// "Get" is the channel by which WS-Management "Get" requests are
// invoked on objects implementing the WSManResourceInvoker
// interface, and the WSManJAXBMBean is such an object.
myJaxbMBean.Get( );
// The ResourceDelegate will update the wrapped // resource bean,
// if necessary (e.g. by uploading the requested attribute values
from the real resource if needed)
ResourceDelegate.preGetProperties(resource, {"PrinterName", "Status",
       "CurrentJobId", "PendingJobIds"} . . . );
// In a WS-Management GET the result is the whole resource - i.e.
// in our case, this is the XML <Printer> element, as defined in our
Printer schema.
result = resource;
ResourceDelegate.postGetProperties(resource, {"PrinterName", "Status",
       "CurrentJobId", "PendingJobIds"} . . . );
return result;

In yet another exemplary scenario, using the JMX getAttributes( ) operation, the JMX getAttribute ( ) operation request can be handled directly by the MBeanServer 220, as illustrated in Table H below:

TABLE H

// A JMX client invokes getAttribute(myJaxbMBeanName,"Status");
MBeanServer.getAttribute(myJaxbMBeanName, "Status");
// The MBeanServer invokes myJaxbMBean.getAttribute("Status")
myJaxbMBean.getAttribute("Status")
// The WSManJAXBMBean invokes the ResourceDelegate, in the
// same way than it did for the WS-Management GET request in Table G,
// except that it only gets the "Status" attribute specifically requested
by the JMX client.
// The ResourceDelegate will update the wrapped resource bean, if
// necessary (e.g. by uploading the requested attributes values from real
resource if needed ResourceDelegate.preGetProperties(resource,
{"Status"} . . . );
// getAttribute( ) is supposed to return only the value of the attribute that
// was specifically requested - and not the whole resource bean as
// was the case for the WS-Management GET.
// The WSManJAXBMBean thus uses the Java reflection API to get
// the value of the requested resource property from the wrapped resource
// bean. An updated value has been stored in the wrapped resource bean
by the ResourceDelegate.
result = resource.getClass0.getMethod~'getStatus").invoke(resource);
ResourceDelegate.postGetProperties(resource, {"Status"}, . . . );
return result;

In the present scenario, the processing involved with setting attributes/properties is largely similar to the processing performed for getting attributes/properties (which is not discussed in detail here). In the case of a WS-Management "Set" or JMX setAttribute[s], the WSManJAXBMBean simply has an additional task, which is to use introspection to transfer the values contained in the input bean (a resource bean) or JMX AttributeList into the WSManJAXBMBean's wrapped resource bean before calling ResourceDelegate.postSetProperties(resource, {list of modified property names}, . . . ).

Based on the discussion above, those skilled in the art can appreciate that the processing performed by the WSManJAXBMBean is completely generic and based only on introspection of the WSManJAXBMBean's wrapped JAXB bean. The "instrumentation" can be completely located in the ResourceDelegate and the ResourceDelegate can be called in the same manner irrespective of whether the received management request came from a JMX client or a WS-Management client.

It is worth noting that, in other embodiments of the present invention, methods for answering custom actions can include an approach where the ResourceDelegate discussed above with respect to FIG. 3 is not entirely responsible for executing requested custom action operations. In one embodiment of the present invention, a WSManJAXBMBean wraps a JAXB serializable bean that is used as a data-object for WS-Management Get( ) and Put( ) operations etc. and JMX setAttribute(s) or JMX getAttribute(s) operations can be redirected by introspection to getting or setting Java™ Bean properties on the wrapped bean, as shown in the getAttribute example of Table H above. In another embodiment of the present invention, a WSManJAXBMBean can wrap a Service Interface generated by Java API for XML Web Services (JAX-WS). In this approach, the operations exposed to JMX Clients can be derived by introspecting the JAX-WS generated Service Interface.

In view of the discussion above, it should be apparent that embodiments of the present invention provide a novel approach to instrumenting WS-Management resources etc. conforming to "standard" XML schemas etc. with JMX MBeans, by leveraging XML Java™ binding technologies like JAXB or other similar binding technologies. In particular, embodiments of the present invention provide an architecture for routing WS-Management etc. requests to JMX MBeans which are instrumenting a WS-Management resource. Additionally, embodiments of the present invention provide an approach for mapping the WS-Management model to a JMX model that can be customized at the JMX-Processor 212 level (e.g. WSManAccessorFactory 214), at the resource level (e.g. WSManResourceAccessor 216), or at the MBean level (e.g. MBean implementing WSManResourceInvoker 218). Further, embodiments of the present invention provide a concrete implementation of an MBean that allows the capability to leverage JAXB serialization, JAXB XML schema to Java™ mapping, and Java™ Bean introspection, to create MBeans that instrument WS-Management etc. resources that follow an externally specified, possibly non-Java™, model.

Figure 4A:
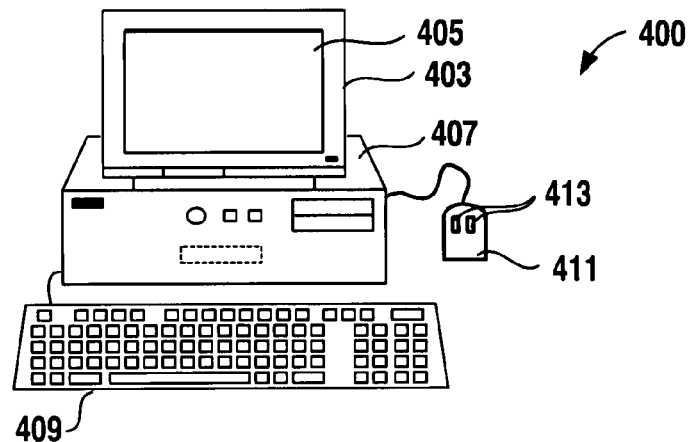
FIG. 4A is a generalized isometric diagram of a typical computer suitable for use with the present invention.

In FIG. 4A, is an illustration of an embodiment of a computer system 400 suitable for use with the present invention including display 403 having display screen 405. Cabinet 407 houses standard computer components (not shown) such as a disk drive, CDROM drive, display adapter, network card, random access memory (RAM), central processing unit (CPU), and other components, subsystems and devices. User input devices such as a mouse 411 having buttons 413, and keyboard 409 are shown.

Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 4B:
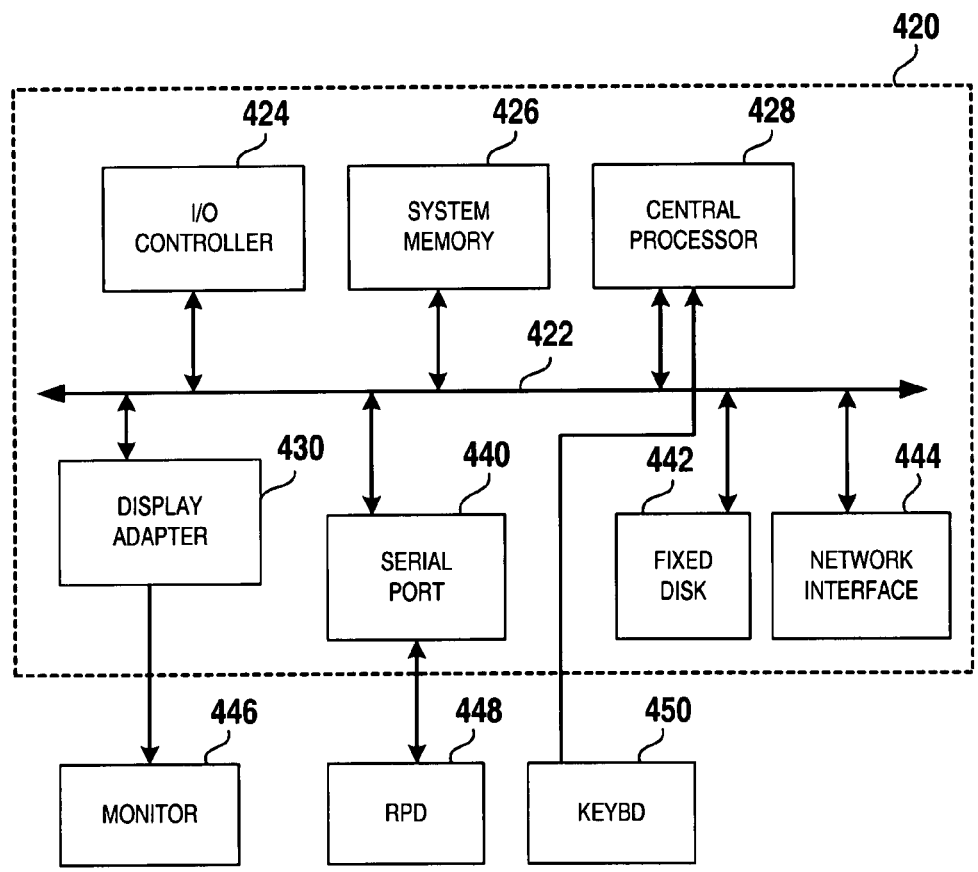
FIG. 4B shows subsystems in the typical computer of FIG. 4A.

FIG. 4B illustrates subsystems that might typically be found in a computer such as computer 400. In FIG. 4B, subsystems within box 420 are directly interfaced to internal bus 422. Such subsystems typically are contained within the computer system such as within cabinet 407 of FIG. 4A. Subsystems include input/output (I/O) controller 424, System Random Access Memory 9RAM) 426, Central Processing Unit (CPU) 428, Display Adapter 430, Serial Port 440, Fixed Disk 442 and Network Interface Adapter 444. The use of bus 422 allows each of the subsystems to transfer data among the subsystems and, most importantly, with the CPU.

External devices can communicate with the CPU or other subsystems via the bus 422 by interfacing with a subsystem on the bus. Monitor 446 connects to the bus through Display Adapter 430. A relative pointing device (RPD) 448 such as a mouse connects through Serial Port 440. Some devices such as a Keyboard 450 can communicate with the CPU by direct means without using the main data bus as, for example, via an interrupt controller and associated registers (not shown).

As with the external physical configuration shown in FIG. 4A, many subsystem configurations are possible. FIG. 4B is illustrative of but one suitable configuration. Subsystems, components or devices other than those shown in FIG. 4B can be added. A suitable computer system can be achieved without using all of the subsystems shown in FIG. 4B. For example, a standalone computer need not be coupled to a network so Network Interface 444 would not be required. Other subsystems such as a CDROM drive, graphics accelerator, etc. can be included in the configuration without affecting the performance of the system of the present invention.

Figure 4C:
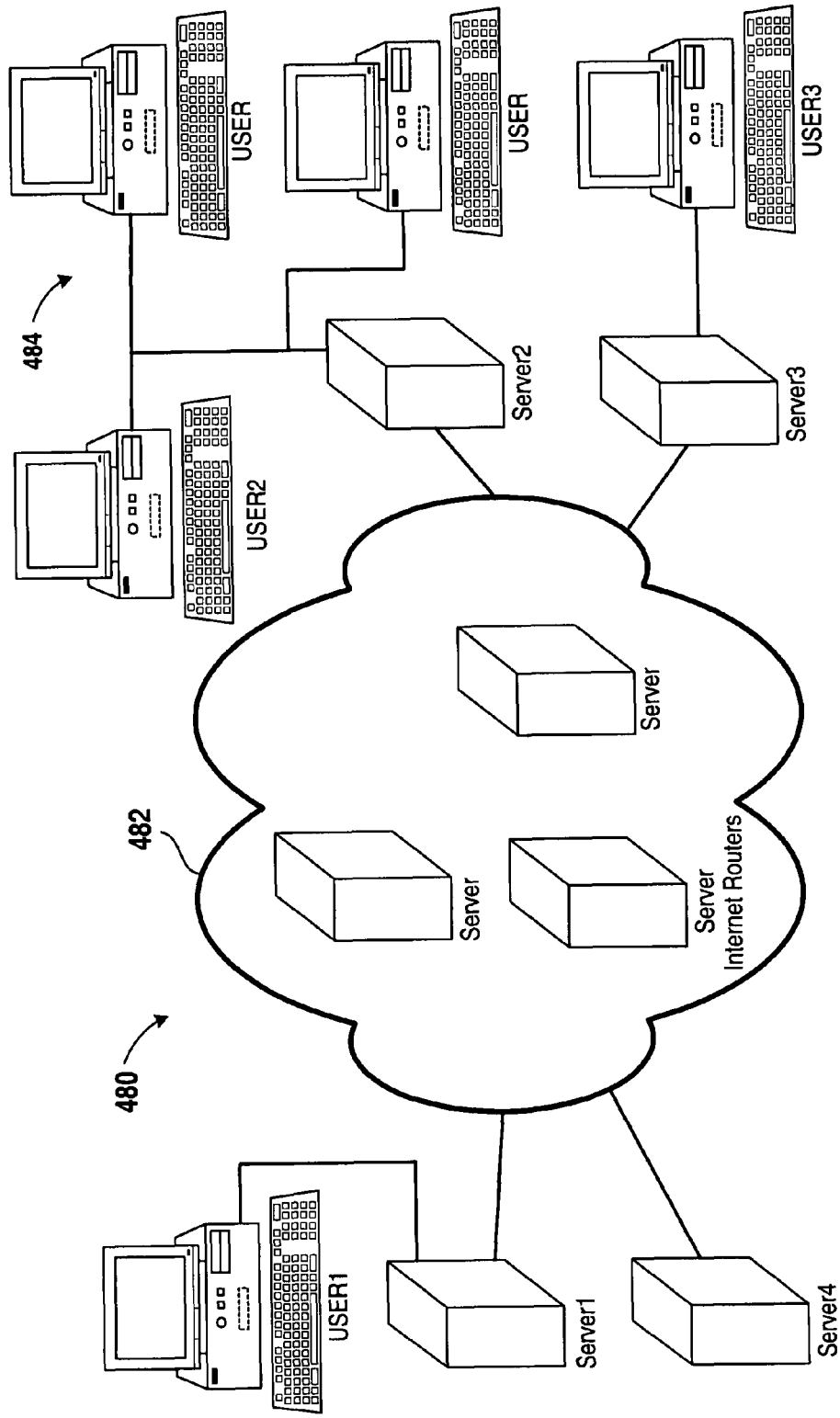
FIG. 4C is a generalized diagram of a typical network suitable for use with the present invention.

FIG. 4C is a generalized diagram of a typical network. In FIG. 4C, the network system 480 includes several local networks coupled to the Internet. Although specific network protocols, physical layers, topologies, and other network properties are presented herein, the present invention is suitable for use with any network.

In FIG. 4C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of sever routers 482. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 484 are shown utilizing a local network at a different location from USER1 computer. The computers at 484 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically though of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for creating an MBean, the method comprising:
   generating one or more Java API for XML Binding (JAXB) serializable Java beans, wherein the JAXB serializable java beans are reconstructed at another place or time, wherein generating the one or more JAXB serializable Java beans includes generating a first JAXB serializable Java bean, a second JAXB serializable Java bean, and a third JAXB serializable Java bean; and
   creating an instance of the MBean, wherein creating the instance of the MBean includes creating the instance of the MBean such that the MBean is capable of exposing the properties of the first JAXB serializable Java bean as MBean attributes, utilizing an instance of the first JAXB serializable Java bean to answer a request associated with the system resource, and utilizing an instance of the second JAXB serializable Java bean to respond to an action associated with the system resource or utilizing an instance of the third JAXB serializable Java bean to respond to the action associated with the system resource, wherein a Common Information Model (CIM) class includes the first JAXB serializable Java bean and wherein the first JAXB serializable Java bean includes properties defined in the CIM class, wherein the action is defined in the CIM class and includes at least one second JAXB serializable Java bean, if the action has one or more input parameters, wherein the second JAXB serializable Java bean facilitates processing the one or more input parameters, and at most one third JAXB serializable Java bean, if the action has one or more output parameters, wherein the third JAXB serializable Java bean facilitates processing the at most one output parameters, wherein the MBean wraps each one of the one or more JAXB serializable beans for instrumenting a system resource deriving from a non-Java model which is a WS-Management (Web Services-Management) model, wherein the MBean is subclassed to implement custom operations, and wherein each operation of the method is executed by a processor.

2. The method as recited in claim 1, wherein the non-Java model is a WS-Management-CIM (Web Services-Management-Common Information Model) model.

3. The method as recited in claim 1, wherein generating the one or more JAXB serializable Java beans includes utilizing a JAXB compiler to generate the one more JAXB serializable Java beans.

4. The method as recited in claim 1, wherein generating the one or more JAXB serializable Java beans includes one of:
   generating the one or more JAXB serializable Java beans from an Extensible Markup Language (XML) schema defining a Web Services (WS)-Management resource, the WS-Management resource defining input and output for WS-Transfer Get and Put operations, generating the one or more JAXB serializable Java beans from an XML schema defining input and output for CIM operations, or generating a first portion of the JAXB serializable Java beans from an XML schema defining a WS-Management resource, the WS-Management resource defining input and output for WS-Transfer Get and Put operation, and generating a second portion of the JAXB serializable Java beans from an XML schema defining input and output for CIM operations.

5. The method as recited in claim 1, wherein the request is a WS-Transfer request.

6. The method as recited in claim 5, wherein the WS-Transfer request is a Get, a Put, a Create, a Delete, a Notifications, or a WS-Transfer Fragment Utilizing XPath operation.

7. The method as recited in claim 1, wherein the action is a custom WS-Management (Web Services-Management) action.

8. The method as recited in claim 1, wherein a non-CIM class includes the first JAXB serializable Java bean, and wherein the first JAXB serializable Java bean includes properties defined in a schema of the non-CIM class.

9. The method as recited in claim 8, wherein the non-CIM class is defined by the schema of the non-CIM class and a Web Services Description Language (WSDL).

10. The method as recited in claim 9, wherein the action is defined in the WSDL and includes:
  at least one second JAXB serializable Java bean, if the action has one or more input parameters, wherein the second JAXB serializable Java bean facilitates processing the one or more input parameters, and
  at most one third JAXB serializable Java bean, if the action has one or more output parameters, wherein the third JAXB serializable Java bean facilitates processing the one or more output parameters.

11. A computer-readable storage media for directing a computer to create an MBean that is capable of instrumenting a system resource deriving from a non-Java model, the computer-readable media comprising:

instructions for generating one or more Java API for XML Binding (JAXB) serializable Java beans, wherein the JAXB serializable java beans are reconstructed at another place or time, wherein generating the one or more JAXB serializable Java beans includes generating a first JAXB serializable Java bean, a second JAXB serializable Java bean, and a third JAXB serializable Java bean; and instructions for creating an instance of the MBean, wherein creating the instance of the MBean includes creating the instance of the MBean such that the MBean is capable of exposing the properties of the first JAXB serializable Java bean as MBean attributes, utilizing an instance of the first JAXB serializable Java bean to answer a request associated with the system resource, and utilizing an instance of the second JAXB serializable Java bean to respond to an action associated with the system resource or utilizing an instance of the third JAXB serializable Java bean to respond to the action associated with the system resource, wherein a CIM class includes the first JAXB serializable Java bean and wherein the first JAXB serializable Java bean includes properties defined in the CIM class, wherein the action is defined in the CIM class and includes at least one second JAXB serializable Java bean, if the action has one or more input parameters, wherein the second JAXB serializable Java bean facilitates processing the one or more input parameters, and at most one third JAXB serializable Java bean, if the action has one or more output parameters, wherein the third JAXB serializable Java bean facilitates processing the at most one output parameters, wherein the MBean wraps each one of the one or more JAXB serializable beans for instrumenting a system resource deriving from a non-Java model which is a WS-Management (Web Services-Management) model, wherein the MBean introspects a JAX-WS (Java API for XML Web Services) interface to handle custom actions and wherein the MBEAN is subclassed to implement custom operations.

\* \* \* \* \*